UNITED STATES PATENT OFFICE.

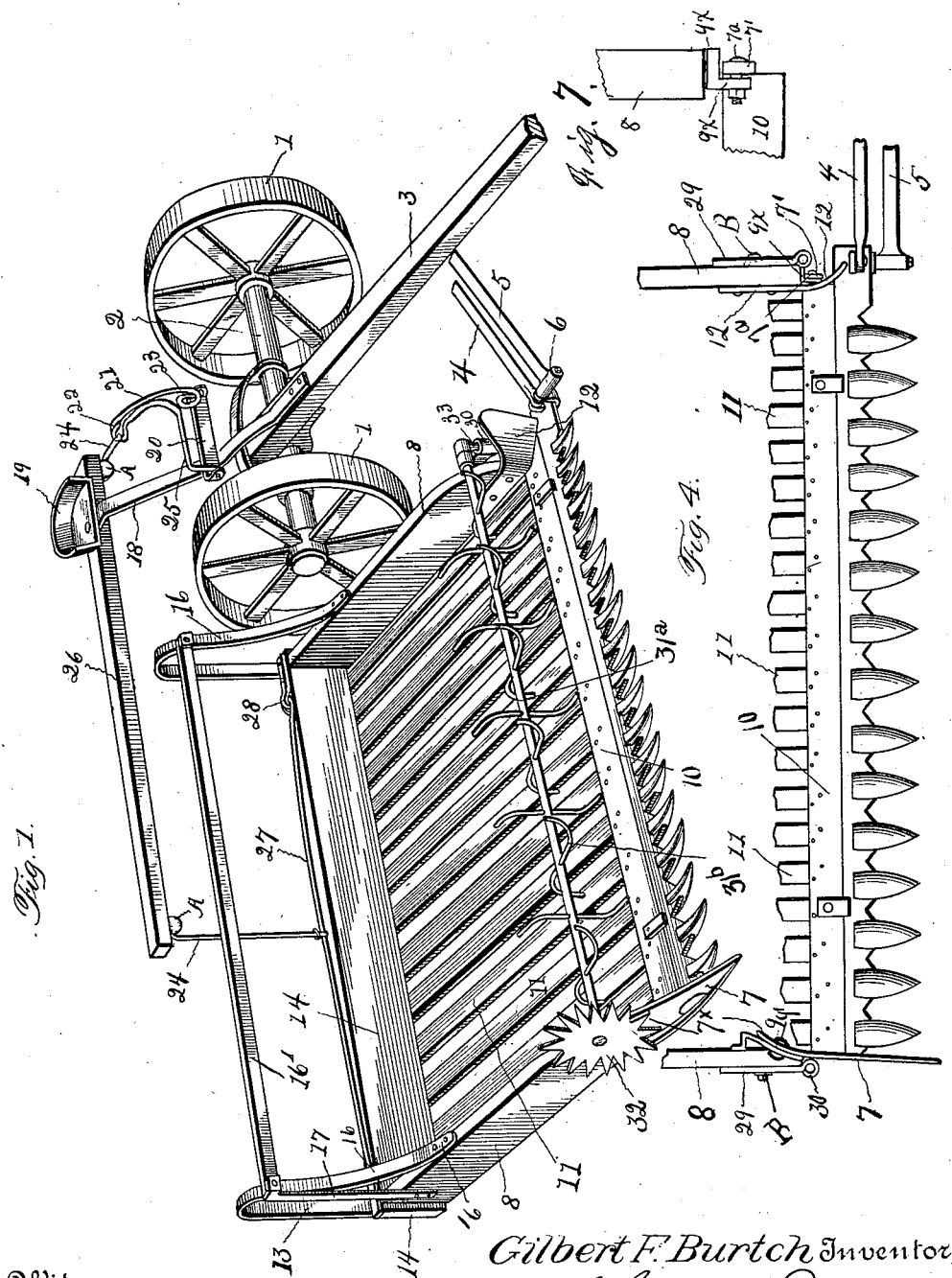

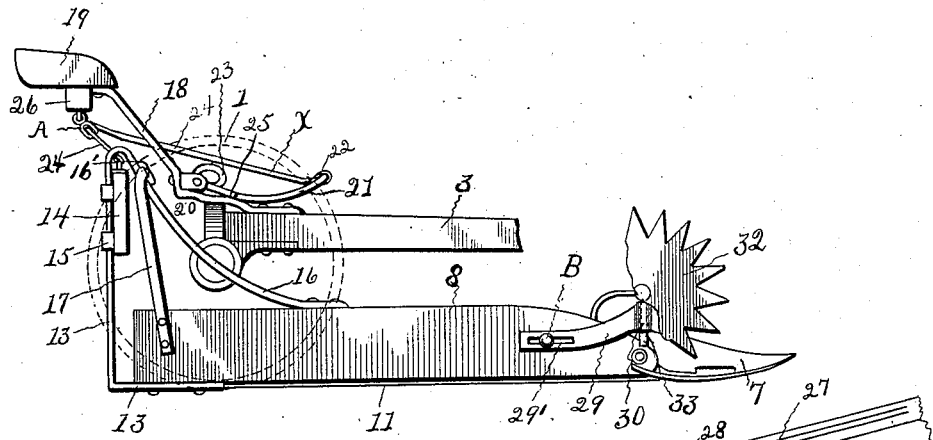
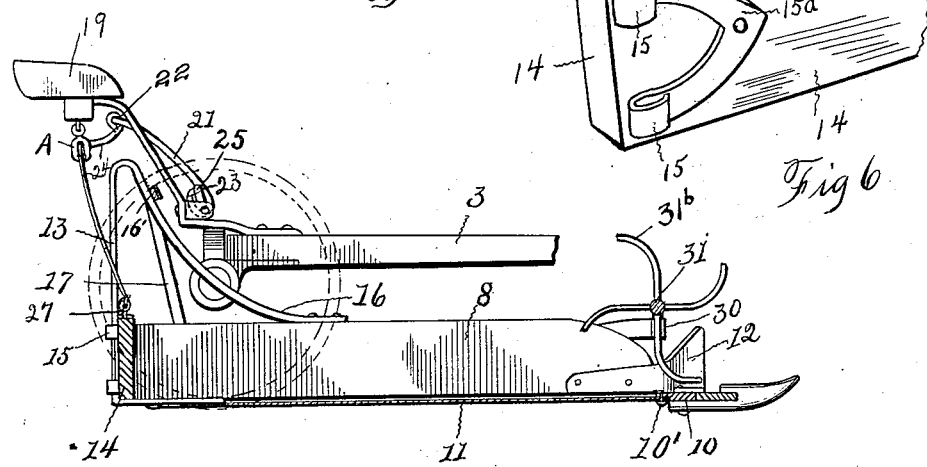
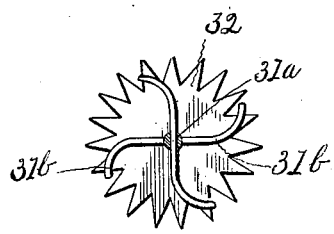

GILBERT F. BURTCH, OF ONIDA, SOUTH DAKOTA.

MOWER ATTACHMENT.

SPECIFICATION forming part of Letters Patent No. 722,673, dated March 17, 1903.

Application filed April 23, 1901. Serial No. 57,036. (No model.)

*To all whom it may concern:*

Be it known that I, GILBERT F. BURTCH, a citizen of the United States, residing at Onida, in the county of Sully and State of South Dakota, have invented certain new and useful Improvements in Mower Attachments; and I do hereby declare the following to be a full, clear, and exact description of the invention, such as will enable others skilled in the art to which it appertains to make and use the same.

My invenvion relates to an attachment for mowing-machines; and its object is to provide a bunching attachment for collecting the cut material and dumping it at the rear of the mower and to insure the delivery of the cut material upon the bunching attachment after being cut.

With these objects in view the invention consists in the novel construction of parts and their arrangement and aggroupment in operative combination.

For a full understanding of the merits, operation, and advantages of my invention reference is to be had to the following description and the accompanying drawings, in which—

Figure 1 is a perspective view of my attachment applied to the frame of a mower and embodying all the features of my invention. Fig. 2 is a side elevation of the same, showing the tail-gate raised. Fig. 3 is a sectional view taken on a line parallel to the line of draft, showing the tail-gate lowered. Fig. 4 is a top plan view showing the manner of mounting the side board to the finger-bar, the parts being broken away. Fig. 5 is a cross-section of the rotary rake. Fig. 6 is a perspective of one end of the end gate. Fig. 7 is an enlarged detail showing one of the pivotal connections of the side board with the cutter-bar.

Like characters of reference indicate corresponding parts throughout the several views.

In the drawings, 1 represents the drive-wheels of an ordinary mowing-machine, which are mounted on the axle 2, and 3 is the tongue therefor. 4 is the pitman, which is connected with suitable mechanism on the frame of the mower for imparting a reciprocating motion to the cutter-bar, while 5 is the stationary bar connected with the frame and forming at its outer end the bearing 6 for the pivotal connection of the finger-bar and which permits the cutting apparatus to be thrown upward. Secured to the outer end of the finger-bar is the shoe 7, the outer end of which extends in advance of the guard-fingers and the inner end being provided with the inwardly-turned portion $7^\times$. This shoe serves to guide the material from the cutter-bars onto the bunching attachment and prevent it from falling over the sides upon the ground.

The shoe 7 affords a bearing for the pivotal connection of the side boards 8, the shoe 7 extending inwardly and being pivotally connected with the plate 9, secured to the side board, by means of a bolt or pivot-pin 9', while to the other side board is connected an angular plate $9^\times$, pivotally connected with the upturned flange 7', by means of a pivot-pin $7^a$, said flange being secured to the end of the finger-bar 10. Attached to the finger-bar 10 by means of rivets 10', as shown in Fig. 3, are the parallel slats 11, which extend back to the rear of the drive-wheels and parallel to the side boards, the free ends dragging upon the cut grass when the machine is in operation. Attached to the inner side of one of the side boards is another shoe 12, which flares outwardly to guide the cut material from the cutter-bar to the slats and prevent any of the cut material from falling over the end of the cutter-bar while passing from the knives to the slats of the bunching attachment.

Attached at their lower ends to the rear of the side boards are the rods 13, which are bent upwardly to form guides for the vertically-moving tail-gate 14. The tail-gate may be provided with suitable loops 15, adapted to envelop the guide-rods and freely slide thereon when the gate is raised or lowered. These loops 15 are formed on the end of a V-shaped plate $15^a$, pivoted at its apex to the end gate, as shown in Fig. 6, and when one side of the end gate is lifted higher than the other by an obstruction the plate is free to swing vertically and always remain in a horizontal position, and thus prevent the loops 15 binding on the guide-rod 13. The other end of this guide-rod is bent inwardly and secured to the top of the side boards, as shown at 16, and forms a brace for the vertical portion thereof. The horizontal rod 16' is secured to the guide-rods, near the top of the same, and to further strengthen and brace the structure an additional upright brace 17 is applied, one end being in engagement with the horizontal bar and the other with the side board.

Attached to the tongue is the usual seat-spring 18, upon which the seat 19 is mounted, and upon this spring is secured the plate 20, having its ends bent at right angles to form bearings for the lever 21. This lever is bent to form an eye 22 at its end, to which the rope or cable 24 is secured, and is further provided with a horizontal portion 25, which provides a convenient means for operating the lever when the foot of the driver is brought in contact therewith. Near the fulcrum-point of the lever is formed a stop 23, which contacts with the upper edge of the plate 20 when the lever is raised and prevents the latter from falling back too far. The beam 26, secured to the bottom of the seat, spring, or other portion of the frame, extends to a position intermediate the ends of the tail-gate and has secured to its under side the pulleys A, through which the cord 24 passes from the lever, and secured at its other end to the rod 27 at a point midway of the ends thereof. The ends of this rod 27 are attached to the top of the tail-gate, near the ends of the latter, as shown at 28, the central portion being left free to spring slightly when the gate is raised. It will be seen that by this construction the draft exerted on the rod 27 at its center will be equally distributed on each end of the tail-gate as it is drawn upward, and thereby prevent binding of the same by one end rising higher than the other.

Secured near the front end of the side board by means of the bolt B are the adjustable plates 29, provided with the slot 29' and an eye or bearing 30. These plates form a support for the rotary rake 31, mounted at the front end of the bunching attachment and above the cutter-bar and serves to conduct the cut material upon the slats. This rake is composed of a shaft 31ª, having transverse holes drilled therethrough, through which holes are inserted the curved tines 31ᵇ, as shown in Fig. 5, and mounted upon one end thereof is the toothed wheel 32, which engages the ground and revolves the rake when the machine is in motion. Upon the ends of the shaft are mounted the pins 33, which fit within the bearing or eye formed on the end of the plate 29, and these pins are made long and extend entirely through the eye, so that when the toothed wheel 32 contacts with an obstruction or when the machine is being operated on uneven ground the rake is allowed a free up-and-down movement without dislodging the same from its journals. By means of the slot 29' and the set-bolt B the rake can be adjusted in advance or in rear of the cutter-bar, as desired, and by curving the tines outwardly the cut material will be conducted upon the slats and not caught by the ends of the tines and thrown in front of the machine, as would occur if they were straight.

The operation of my device is as follows: As the material is cut by the cutter-bar the toothed wheel 32 being in engagement with the ground will revolve the rotary rake, and the curved tines will catch the cut material and conduct it rearwardly onto the slats 11, the slats being made of flat metal strips separated to form open spaces between them through which the stubble projects and by engagement with the cut grass holds the latter while the machine is drawn forward and the slats from under it. This in effect causes the cut grass to move to the rearward and lodge against the tail-gate 14. When a sufficient quantity is upon the slats, the driver by pressing his foot against the extension 25 on the lever will cause the latter to be thrown downward to the position shown in Fig. 2. This will, through the rope 24, raise the tail-gate, as shown in Fig. 2. Now should any of the material be caught between the lower edge of the side boards or the slats or for any other reason it be desired to raise the side boards the driver by pressing the rope between the ends of the lever, as at X in Fig. 2, will cause the tail-gate to be further raised and by being in engagement with the top of the guide-rods will consequently raise the side boards, which is effected through the pivotal connections at the ends of the finger-bar. When the loose grass has been deposited from the slats, the lever may be thrown upward to the position shown in Figs. 1 and 3 and the tail-gate lowered.

The rotary rake is of special advantage in mowing short prairie grass or in mowing any grass when a heavy wind is blowing, since the wind would blow the grass off the slats after it has been cut and allow it to be blown away from the machine. My invention will overcome this disadvantage by providing the rake with curved tines which grasp the cut material and force it rearwardly onto the slats, and to further insure the delivery of the cut material upon the same the shoe 7 is extended beyond the ends of the fingers, while the other shoe 12 has a considerable outward flare, as shown in Fig. 4.

Having thus described my invention, what I claim, and desire to secure by Letters Patent, is—

1. In an attachment for mowing-machines, the combination of a slatted platform secured to the finger-bar, side boards pivotally attached to the finger-bar, guide-rods on the side boards, a tail-gate slidable on the guide-rods, a spring-bar having its ends secured adjacent to the ends of the tail-gate, an operating-lever and a flexible connection secured at one end to the said lever and at the other end to the spring-bar at a point midway the ends thereof.

2. In an attachment for mowing-machines, the combination of a slatted platform attached to the finger-bar, of side boards pivotally secured to the ends of the finger-bar and inclosing the sides of the slatted platform, a vertically-slidable tail-gate mounted adjacent the free ends of the slats and side boards, a spring-bar secured at its ends to the top of the tail-gate near the ends thereof, whereby a resilient connection is made between the tail-gate and its operating mechanism, a lever mounted upon the frame of the mower, said lever bent in an arc of a circle and provided with a stop and a lateral extension, and a flexible connection between the lever and the rod on the tail-gate, whereby the tail-gate is adapted to be raised or lowered.

3. The combination with the finger-bar of a mowing-machine, of slats secured to the side of the finger-bar and extending rearwardly from the same, side boards pivotally attached to the ends of the finger-bar and inclosing the sides of the slats, a rod attached to the free end of a side board and bent to form a vertical guide-rod, and an oblique brace for the guide portion of the rod, a tail-gate adapted to slide vertically upon said rod, a lever mounted on the frame, a beam attached to the frame and extending transversely above the tail-gate, pulleys mounted on the beam, a flexible connection adapted to pass through the pulleys and secured at its ends to the lever and tail-gate, whereby the tail-gate may be raised and lowered.

4. In an attachment for mowing-machines, a slatted platform, side boards inclosing the sides of the slats, an adjustable rotary rake mounted in front of the side boards and having curved tines, and a toothed wheel on the shaft of the rake adapted to engage the ground, and by means of which the rake is revolved.

5. In an attachment for mowing-machines, slats secured to the finger-bar and extending rearwardly of the same, side boards inclosing the sides of the slats, shoes secured to the side boards for conducting the cut material upon the slats, adjustable plates mounted on the front end of the side boards and having an eye, a rotary rake having transverse journals adapted to be loosely hung within the eye of the plate, a toothed wheel mounted on the end of the rake and adapted to contact with the ground whereby rotary movement is imparted to the rake, a vertically-slidable tail-gate mounted adjacent the ends of the side boards and the slats, and means upon the frame for raising the tail-gate.

6. In an attachment for mowing-machines, the combination of a slatted platform attached to the finger-bar, side bars pivotally secured to each end of the finger-bar, a vertically-slidable tail-gate, a guide-rod attached to each of the side boards, loops pivoted to each end of the tail-gate and enveloping the guide-rods and means for elevating the tail-gate.

7. In an attachment for mowing-machines, the combination of a slatted platform attached to the finger-bar, side bars secured to each end of the finger-bar, a vertically-slidable tail-gate, a guide-rod attached to the rear end of each side board, means on the tail-gate in engagement with the guide-rods to prevent binding of the gate in its upward-and-downward movement, and means for elevating the tail-gate.

8. In an attachment for mowing-machines, the combination of a slatted platform attached to the finger-bar, a vertically-slidable tail-gate, a guide-rod attached to each of the side boards, a plate pivoted to each end of the tail-gate, said plates being provided with loops adapted to engage the guide-rods and means for elevating the tail-gate.

In testimony whereof I affix my signature in presence of two witnesses.

GILBERT F. BURTCH.

Witnesses:
    J. H. GROPENGIESER,
    F. R. PIERCE.